Figure 1:
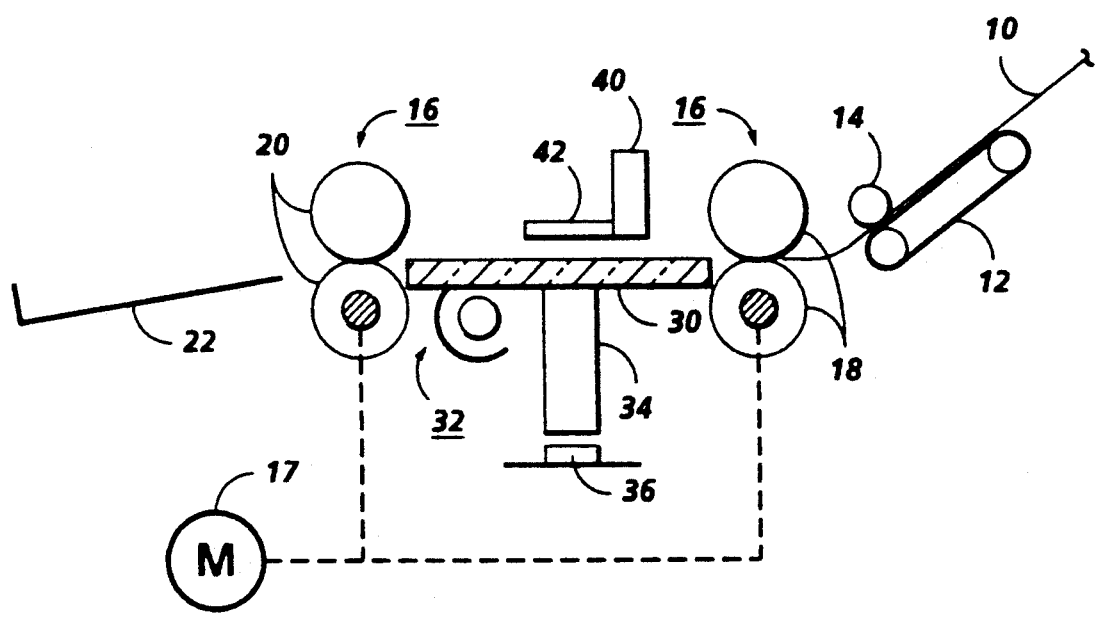

United States Patent

Dash et al.

[11] Patent Number: 5,221,976
[45] Date of Patent: Jun. 22, 1993

[54] HYBRID SLOW SCAN RESOLUTION CONVERSION

[75] Inventors: Robert J. Dash, East Rochester; David B. Baum, Ontario, both of N.Y.

[73] Assignee: Xerox Corporation, Stamford, Conn.

[21] Appl. No.: 695,060

[22] Filed: May 3, 1991

[51] Int. Cl.⁵ .............................................. H04N 1/04
[52] U.S. Cl. ..................... 358/486; 358/474; 358/496; 358/451; 382/47
[58] Field of Search ............... 358/451, 447, 445, 486, 358/496, 498; 382/47

[56] References Cited

U.S. PATENT DOCUMENTS

| | | | |
|---|---|---|---|
| 3,646,256 | 2/1972 | Jacob et al. | 358/486 |
| 4,447,832 | 5/1984 | Kurata et al. | 358/486 |
| 4,687,944 | 8/1987 | Mitsuka et al. | 358/451 |
| 5,047,871 | 9/1991 | Meyer et al. | 358/486 |
| 5,101,282 | 3/1992 | Honma | 358/486 |
| 5,177,626 | 1/1993 | Nosaki et al. | 358/486 |

Primary Examiner—Edward L. Coles, Sr.
Assistant Examiner—Fan Lee
Attorney, Agent, or Firm—Mark Costello

[57] ABSTRACT

In an image input scanner, image information is acquired by sensing light from an image at an array of photosites arranged across a path of relative movement of the array and the image. To obtain resolution k, given a nominal slow scan velocity v for the relative movement between the array and the image, slow scan velocity is varied continuously over a range of ½ v to v. In combination, with variation of slow scan velocity over the range of ½ v to v, a limited scan line throw away scheme is matched to the range of velocity, where the ratio of lines kept to lines discarded in a group of lines is defined by the ratio 1:N where for every N lines, a pattern is repeated which passes 1 line of N lines, where N is a positive integer.

6 Claims, 3 Drawing Sheets

HYBRID SLOW SCAN RESOLUTION CONVERSION

The present invention relates generally to a resolution conversion method for use in conjunction with an image input scanner, and more particularly to a method of providing multiple slow scan resolutions with minimal motor velocity variations.

BACKGROUND OF THE INVENTION

Image information, be it color or black and white, is commonly generated in a bitmap format at a particular scale, and resolution $K \times L \times b$, corresponding to a desired printer output, where K is a number of spots per unit of length in one dimension, L is a number of spots per unit length in the other dimension, and b is the depth of each pixel, in number of levels. This bitmap is present for every color separation of the output device, i.e., 4 bitmaps for a 4-color output device, 3 for a 3-color, 2 for a 2-color and 1 for a black and white output device. In a common example of a black and white output, image data comprising a bitmap to be printed is provided to a printer suitable for printing at 300 spots per inch (spi) in both dimensions, at a one bit depth giving 2 levels. Many considerations drive this single selection of resolution, including the desirability of providing only a limited number of fonts (alphanumeric bitmaps) so as to use only a limited amount of storage space. Common software packages available on personal computers or for operation of input scanners for document creation also usually provide only a single resolution output.

Increasingly, the resolution available from printers varies over a wider range of choices. Printer resolutions are available over a range, for example, from less than 200 spi to more than 600 spi. Resolutions vary for a number of reasons, generally related to the quality of the output image. Simply printing a 300 spi bitmap at 400 spi or 600 spi is undesirable however, since the image will be reduced substantially in size on the output page or display. It would be highly desirable to provide the capability of printing any image at any resolution, while selecting the output size. Scaling, or magnification and reduction is an operation essentially identical to resolution conversion, except that in scaling the objective is to obtain an image that is a different size at the same resolution.

In electronic input scanners for document scanning, image information is acquired by sensing light from an image at an array of photosites arranged across a path of relative movement of the array and the image. The photosites, typically photodiodes or amorphous silicon sensors, are formed on a semiconductor substrate or chip, with a number of chips butted or otherwise arranged closely together to form the array. The photosite array may provide a 1:1 correspondence of photosites to the width of the actual image (a full width array), or may rely on optics to reduce the apparent image size to correspond to a smaller array. In use, a photosite produces an output signal proportional to light intensity detected at the photosite. Slow scan resolution of the image (resolution of the image along a path parallel to the direction of relative movement) may be a function of the velocity of the relative movement. The array of photosites is integrated at a constant rate, and relative movement occurs at selected velocities, with relatively low velocities corresponding to high resolution and relatively high velocities corresponding to low resolutions. It can be seen that to provide resolutions varying from 75 spi to 600 spi, the motor must be operated to provide relative motion at speeds varying over the range from 8 inch/sec to 1 inch/sec. Since some resolution such as 300 spi will be considered nominal, for which the motor optimum operating condition will be designed, the motor will have to vary in operation from 25% of nominal to 200% of nominal. It is difficult and expensive to design a mechanical system to meet these specifications and achieve optimum image quality.

In another method of image conversion, believed to be used by the commercial Hewlett Packard Scanjet Plus (a product of Hewlett Packard Co., Palo Alto, Calif.) to obtain a number of different resolutions, an image may be samples at a relatively high resolution, and then, lines are thrown away in accordance with a scheme to reduce the amount of image data to a point where the desired image is obtained. This scheme has been coupled with arrangements where a very limited number of motor velocities, are available. However, to obtain a full range of conversions requires complex throw away schemes, some of which require fractional ratio of lines kept to lines thrown away, which tend to cause artifacts at visible image frequencies.

SUMMARY OF THE INVENTION

In accordance with the invention, there is provided a method of scanner slow scan resolution conversion, which advantageously combines motor speed control methods for varying scanner slow scan resolution with line throw away schemes to obtain a large number of slow scan resolutions.

In accordance with one aspect of the invention, in an image input scanner, image information is acquired by sensing light from an image at an array of photosites arranged across a path of relative movement of the array and the image. To obtain resolution k, given a nominal slow scan velocity v for the relative movement between the array and the image, slow scan velocity is varied continuously over a range of $\frac{1}{2}$ v to v. In combination, with variation of slow scan velocity over the range of $\frac{1}{2}$ v to v, a limited scan line throw away scheme is matched to the range of velocity, where the scheme at a minimum saves at more than 1 out of 4 lines so that motor speed resolution stays with optimum operating range, and image variation due to scan line throw away stays within optimum range.

In accordance with another aspect of the invention, while motor speed is variable over the described range in increments within the motor control limits of the device, only three line throw away schemes are used, including: 1) no throw away; 2) throw away one of every two lines; and 3) throw away three of every four lines. The throw away schemes are implemented so that distance between kept lines is always uniform.

Optimum image quality is obtained by using an integer line throw away scheme where, for every group of N lines, a pattern is repeated which saves 1 line, and throws away N−1 lines, and where N must be a positive integer. Because image quality decreases as the value of N increases, an input scanner will have a maximum desirable value of N, where the maximum desirable value of N will be a function of the input scanner slow scan resolution. Exceeding the maximum desirable value of N will create artifacts at visible image frequencies. Additionally, where the positions of the kept lines vary in distance with respect to the next kept line, image artifacts are also noted. Accordingly the simply 1:N line throw away pattern is consistently repeated.

Figure 2A:
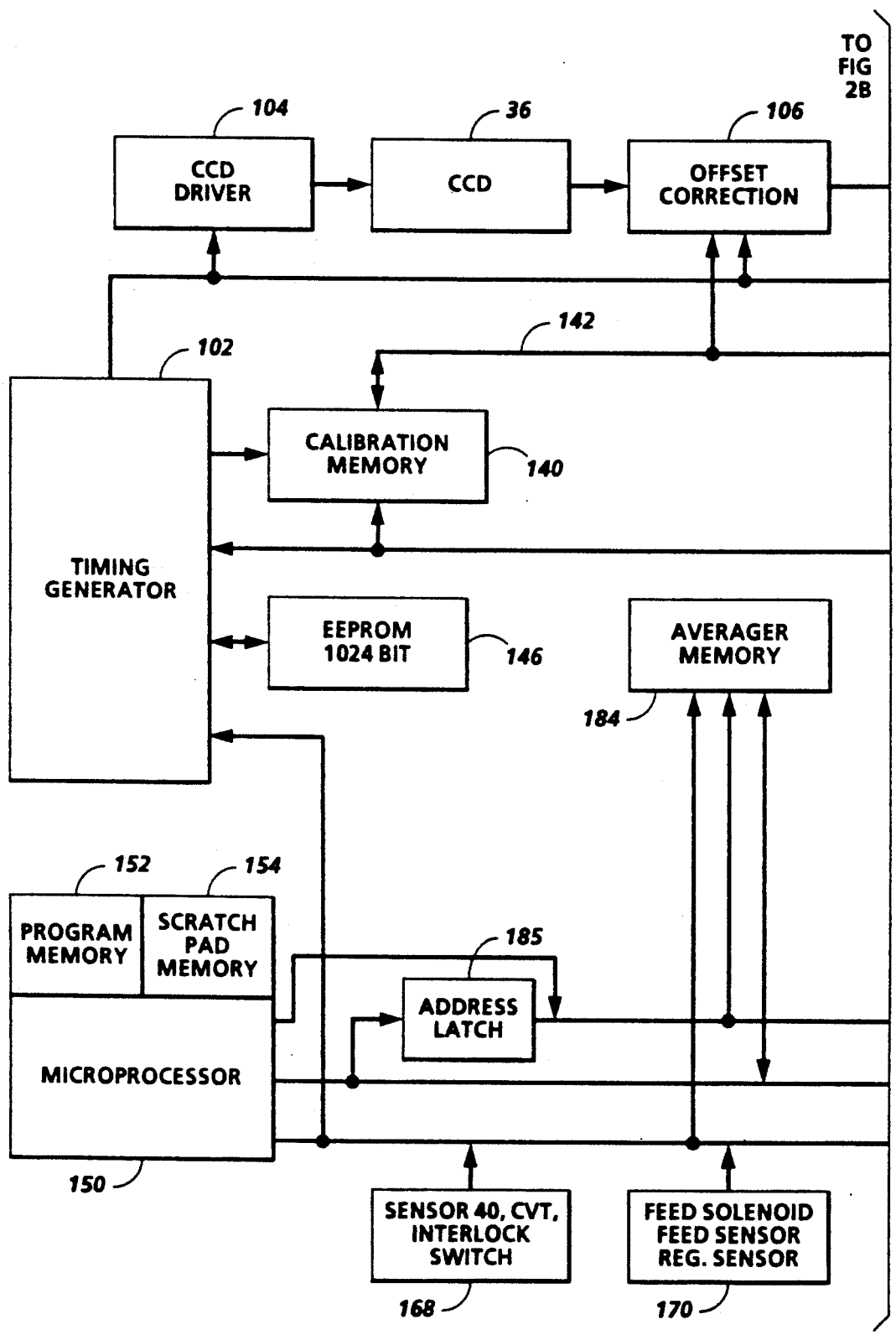
Figure 2B:
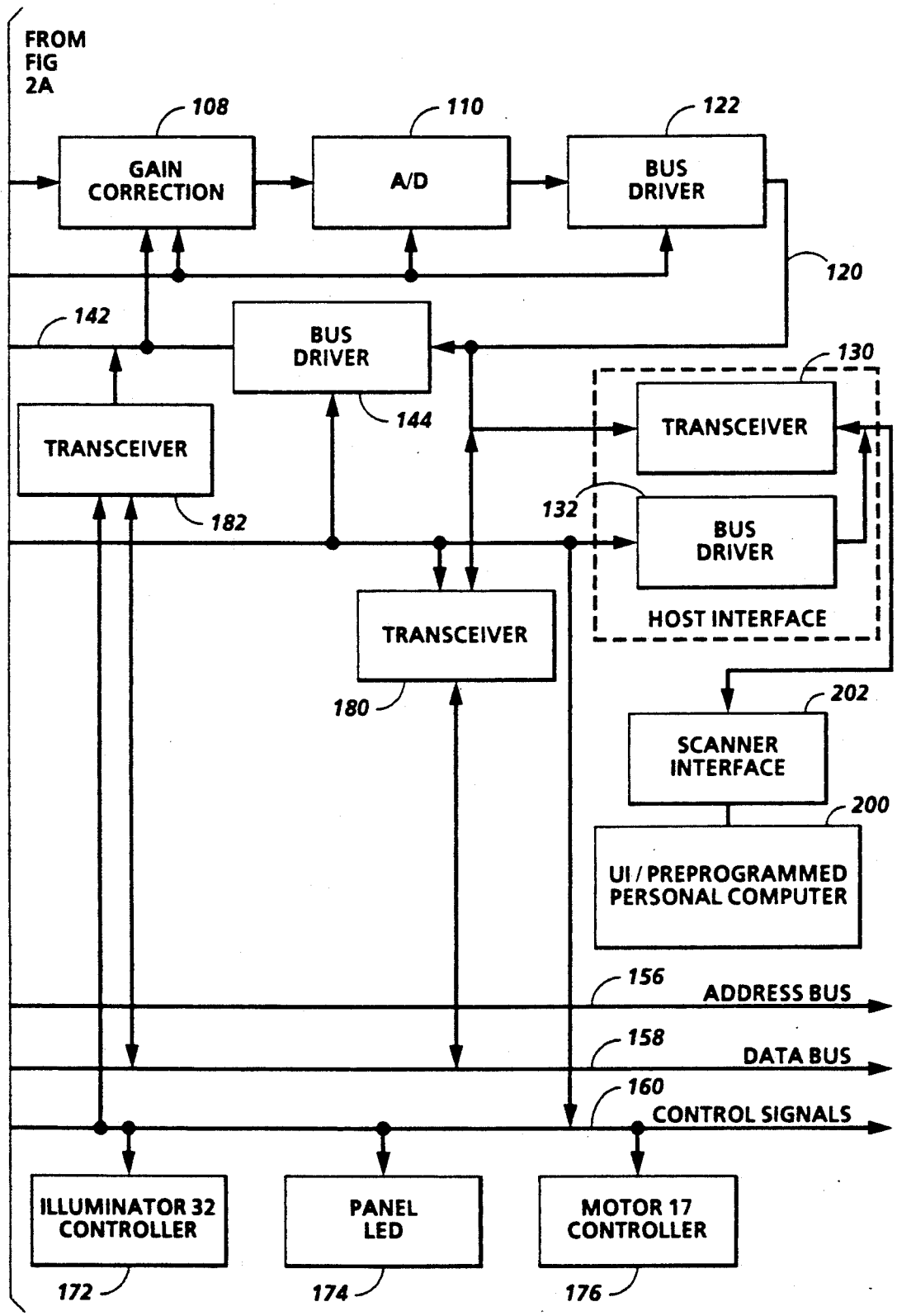

These and other aspects of the invention will become apparent from the following description used to illustrate a preferred embodiment of the invention read in conjunction with the accompanying drawings in which:

FIG. 1 demonstrates a somewhat schematic diagram of an image scanner possibly incorporating the present invention;

FIG. 2A and 2B show an image processing arrangement in which the present invention may be implemented.

Digital image information in the form of image data picture elements, (hereinafter, pixels), digital voltage representations of image intensity at discrete locations in an image, is provided from a suitable source. For example, the image data pixels may be obtained through line by line scanning of an image bearing original by one or more photosensitive imaging devices, such as an array of photosites. Image data pixels constitute the response of photosites indicating the intensity of light detected at the photosites over a given period. Line by line scanning of an image bearing original for the derivation of image information (image data pixels) is well known and does not form a part of the present invention.

With reference now the drawings where the showings are for the purpose of illustrating a preferred embodiment of the invention and not for limiting same, in an application incorporating the present invention, FIG. 1 shows one possible embodiment of a line by line image scanning device. Input tray 10 supports documents for feeding to an image position, via center retard belt feeder 12 and corresponding nip roll 14. Documents to be scanned are directed to a constant velocity transport (CVT) 16, driven by motor 17 drivingly connected thereto via pulley drives (not shown), for transports of sheets across a scanning position. Documents are initially engaged by CVT 16, at a first set of rolls 18, which drive the sheet across an imaging position to a second set of rolls 20, which engage the documents until they are ejected into an output tray 22.

An imaging position is defined by an imaging platen 30, which supports documents during the imaging process, an illuminator 32 typically comprising a lamp and reflector, a set of mirrors and an optical reducing lens 34 (shown schematically), which directs light from illuminator 32 reflected from a document being scanned to a sensor array 36, in this case a CCD array of sensors. A start of scan detector (or registration detector) 40 signals the system when a lead edge of a document is entering the imaging position, and a white calibration strip 42 is provided at a position for imaging by sensor array 36, when a document is not interposed between the sensor array and calibration strip 42. While the described arrangement moves original bearing images past a fixed array (a moving document scanning arrangement), stationary document scanning arrangements are known. Additionally, while the described arrangement is primarily applicable to paper documents, scanning arrangements scanning non-paper originals such as slides, aperture cards or other image bearing originals are known. The present invention has application to all such scanning arrangements.

With reference now to FIGS. 2A and 2B, CCD array 36 is driven into an integrating condition periodically, in accordance with signals from a timing generator 102, and CCD driver 104. Analog values (small analog voltages) representing pixels or image data from each photosite are derived from CCD sensor array 36, and upon derivation, are directed to offset corrector 106 and gain corrector 108, as will be further explained hereinbelow. The analog pixel values are then converted to digital values at analog-to-digital (A/D) converter 110. Timing generator 102 provides pixel and scan line timing or sync signals to the CCD array 36, offset corrector 105, gain corrector 108, analog-to-digital converter 110. Digital image data is then directed onto a video data bus 120, controlled by video data bus driver 122, and eventually to output transceiver 130, where it is directed to other external devices in accordance with host interface bus driver 132 control. For certain purposes, including resolution conversion or scaling in accordance with the present invention, video image data may also be directed into the image processing system, via output transceiver 130, which is a bi-directional device.

Timing generator 102 also provides scan line and pixel timing signals to calibration memory 140, which in this particular case may be an 8K×8 static RAM memory device. Correction values are directed from calibration memory 140 in accordance with timing signals from timing generator 102 to correction bus 142 from which correction data is directed to offset corrector 106 and gain corrector 108. Accordingly, correction data corresponding to each photosite is delivered to the correctors for each pixel in sequence. Timing generator 102 may be a programmable gate array device, controlled in accordance with a EEPROM device 146. Alternatively, timing generator 102 may be a masked gate array device, which does not require an external program storage. Calibration or correction data is also directed into calibration memory 140 from correction data bus 142.

Microprocessor controller 150 includes program memory 152, which in this case is an 8K bit ROM device, and a scratch pad memory 154, in this case a 256K bit RAM device. Microprocessor controller 150 produces data on three main buses: an address bus 156, a data bus 158, and a control signal bus 160. Control signal bus 160 receives control signals from the sensor group 168, including start of scan sensor 40 and CVT interlock switch (not shown), to provide mechanical control of the CVT. Control signal bus 160 receives control signals from a feeder solenoid, feeder sensor, and a feeder registration switch, illustrated as a single block 170. Control signal bus 160 provides control signals for operation of a lamp controller 172 for control of the illuminator 32, operation of an LED panel 174, and for motor controller 176 controlling motor 17. Microprocessor controller 150 may also provide control of timing generator 102.

On data bus 158, data produced or required by microprocessor controller 150 may be directed to and from external devices, via transceiver 180, which is connected for bi-directional data transmission to and from video data bus 120 and transceiver 130, in accordance with timing and control signals from timing generator 102 and microprocessor controller 150 directed to transceiver 180. Control signal bus 160 directs control signals for control of, and data bus 158 carries data to and from, transceiver 182, for calibration procedures.

Address bus 156 directs address information concurrently with control signals from control signal bus 160 and data from data bus 158, to an averager memory 184. Address latch 185 is used to demultiplex the lower 8 address bits from data bus 158.

In accordance with one aspect of the invention and as illustrated in FIGS. 2A, 2B, via a user interface 200, which may conveniently be a preprogrammed image editing package operable on a personal computer, programmed to provide a magnification or reduction value to be forwarded via a scanner interface 202 to the scanner image processing electronics, magnification and reduction ratios required are directed to microprocessor 150, via transceiver 130, transceiver 180, and data bus 158, to enable the operation of microprocessor 150 in accordance with the software routine shown in the attached appendix, written in the "C" language and stored in personal computer memory (not shown). Microprocessor 150 is operable to control motor controller 176, which controls motor 17, to drive CVT 16 to produce relative movement between the document and the scanning array 36. The motor speed selected in the present embodiment is one of 100 speeds in a look up table. Of course, a greater or lesser number of speeds is possible, while still operating in a substantially continuous range of ratio values. The motor operation is continuously variable, i.e., it is operable to produce any document velocity within the range of velocities, although for control purposes, motor 17 may have incremental operating conditions to produce, for example, scalings at 1% increments. However, this is an operator convenience control requirement. In the present embodiment, motor controller 176 is operable over a range of speeds varying from 1 inch per sec. (ips) to 2 ips, with a nominal operation at 2 ips.

| Slow scan Resolution (% of nominal) | Slow Scan Velocity (ips) | N |
|---|---|---|
| 200 | 1.000 | 0 |
| 199 | 1.005 | 0 |
| 198 | 1.010 | 0 |
| — | — | 0 |
| 102 | 1.961 | 0 |
| 101 | 1.980 | 0 |
| 100 | 2.000 | 0 |
| 100 | 1.000 | 1 |
| 99 | 1.010 | 1 |
| 98 | 1.020 | 1 |
| — | — | 1 |
| 52 | 1.923 | 1 |
| 51 | 1.961 | 1 |
| 50 | 2.000 | 1 |
| 50 | 1.000 | 2 |
| 49 | 1.020 | 2 |
| 48 | 1.040 | 2 |
| — | — | 2 |
| 27 | 1.864 | 2 |
| 26 | 1.923 | 2 |
| 25 | 2.000 | 2 |

Microprocessor 150 uses a line throw away algorithm parameter of the software to tell the timing generator 102 how many scan line synch signals to suppress, sending the signal to timing generator via control signal bus 160. Accordingly, the video signal passed to the output via transceiver 130 is limited to those video scan lines that have a video scan line synch signal. Therefore, if the timing generator suppresses 1 out of every 2 video scan line synch signals, then one out of every two lines is thrown away.

It will be appreciated that the resolution conversion described is relevant only to the resolution of the image in the direction of relative movement between the image and image acquisition device. Along the axis of the sensor array, many resolution varying arrangements are known, and are applicable.

The invention has been described with reference to a preferred embodiment. Obviously modifications will occur to others upon reading and understanding the specification taken together with the drawings. This embodiment is but one example, and various alternatives, modifications, variations or improvements may be made by those skilled in the art from this teaching which are intended to be encompassed by the following claims.

APPENDIX

```
get_scanner scaling(scale_factor, resolution,
                   motor_speed_scale_factor, line_drop_algo)
int     scale_factor;
int     resolution;
int     *motor_speed_scale_factor;
int     *line_drop_algo;
{
    float scale;
    scale = get_scale_factor(scale_factor,resolution);
    scale_factor = (int)(scale*100.0);
    if(scale_factor < = 49){
        *motor_speed_scale_factor = scale_factor * 4;
        *line_drop_algo = 1;
    else{
        if(scale_factor > = 100){
            *motor_speed_scale_factor = scale_factor;
            *line_drop_algo = 0;
        }
        else{
            *motor_speed_scale_factor = scale_factor;
            *line_drop_algo = 2;
        }
    }
}
float
get_scale_factor(int_scale factor, int_resolution)
int     int_scale_factor;
int     in_resolution;
    float scale_factor;
    float resolution;
    scale_factor = (float)int_scale_factor/100.0;
    resolution = (float)int_resolution/300.0;
    scale_factor = scale_factor * resolution;
    return(scale factor);
```

We claim:

1. An imaging device including an array of photosensitive elements extending along an axis arranged in a first direction, detecting light reflected from a document, each photosite periodically producing a response indicative of detected light intensity; transport means for providing relative movement of the document and the array at a velocity v in a second direction, generally perpendicular to said first direction, for line by line acquisition of image information at a predetermined resolution in the second direction, and means for varying the resolution in the second direction over a range from A to B, where A and B are values of percentage change in resolution, comprising:
   means to vary said velocity v of said relative movement over a predetermined continuous range of velocities corresponding to a desired range of resolutions that is less than the range from A to B;
   means for selectively passing lines of image information for further processing;
   storage means, storing a value indicating for velocity v, a ratio of a first number of lines to be passed in a group of lines to a second number indicating the total number of lines in the group thereof, each stored value corresponding to a given resolution in the range from A to B; and resolution variation control means, operable in response to a resolution variation command to vary resolution over the range from A to B in the second direction, said control means controlling said velocity varying means to produce document advancement at a velocity v within the range of velocities, and to cause said selective line passing means to pass a number of lines of acquired image information in accordance with the ratio stored at said storage means for velocity v at which the document is advancing to obtain resolution conversion over the entire range from A to B.

2. The device as defined in claim 1, wherein the ratio is defined by 1:N, where for every N lines, a pattern of line passing is repeated, which passes 1 line of N lines, where N is a positive integer greater than 1.

3. An imaging device including an array of photosensitive elements arranged along an axis in a first direction, detecting light reflected from a document, each photosite periodically producing a response indicative of detected light intensity; document transport means for advancing a document past the array at a velocity v in a second direction, generally perpendicular to said first direction, for line by line acquisition of image information at a predetermined scaling ratio in the second direction, and means for varying the scaling ratio in the second direction over a range from A to B, where A and B are values of percentage change in scale, comprising:

a motor mechanically coupled to the document transport means to produce said document advancement, and controllable in response to a motor control signal to vary velocity v over a predetermined continuous range of velocities corresponding to a scaling range that is less than the range from A to B;

means for selectively passing lines of image information for further processing;

storage means, storing a value indicating for velocity v, a ratio comparing a first number of lines to be passed in a group of lines to a second number indicating the total number of lines in the group thereof, corresponding to a given scaling amount in the range from A to B; and scaling variation control means, operable in response to a scaling variation command to vary scale over the range from A to B in the second direction, to direct motor control signals controlling said motor to produce document advancement at a predetermined velocity within the velocity range, and to cause said selective line passing means to pass a number of lines of acquired image information in accordance with the ratio stored at said storage means for velocity v at which the document is advancing, to obtain a change in scale over the entire range from A to B.

4. The device as defined in claim 3, wherein the ratio is defined by 1:N, where for every N lines, a pattern is repeated which passes 1 line of N lines, where N is a positive integer greater than 1.

5. The device as defined in claim 3, wherein for document transport means advancing documents past the array at velocity v, velocity v is variable over a range of $\frac{1}{2}$ v to v.

6. The device as defined in claim 5, wherein for a scaling range of 100–200%, and motor velocity variable over a range of $\frac{1}{2}$ v to v, the ratio is defined by 1:1; for a scaling range of 50% to 100%, and motor velocity in the range of $\frac{1}{2}$ v to v, the ratio is defined by 1:2; and for a scaling range of 25% to 50%, and motor velocity in the range of $\frac{1}{2}$ v to v, the ratio is defined by of 1:4.

* * * * *